United States Patent
Gisler et al.

(10) Patent No.: US 10,906,072 B2
(45) Date of Patent: Feb. 2, 2021

(54) INSPECTION DEVICE FOR INSPECTING A CABLE END OF A CABLE AND A METHOD FOR CLEANING

(71) Applicant: KOMAX HOLDING AG, Dierikon (CH)

(72) Inventors: Adrian Gisler, Eschenbach (CH); Markus Kiser, Büren (CH); Martin Stocker, Küssnacht (CH)

(73) Assignee: KOMAX HOLDING AG, Dierikon (CH)

( * ) Notice: Subject to any disclaimer, the term of this patent is extended or adjusted under 35 U.S.C. 154(b) by 0 days.

(21) Appl. No.: 16/527,086

(22) Filed: Jul. 31, 2019

(65) Prior Publication Data

US 2020/0047221 A1 Feb. 13, 2020

(30) Foreign Application Priority Data

Aug. 13, 2018 (EP) ..................... 18188620

(51) Int. Cl.
*B08B 5/02* (2006.01)
*H04N 5/225* (2006.01)
(Continued)

(52) U.S. Cl.
CPC ............. *B08B 5/02* (2013.01); *H04N 5/2256* (2013.01); *H04N 5/22521* (2018.08); *G06T 7/0004* (2013.01); *H01R 43/04* (2013.01)

(58) Field of Classification Search
None
See application file for complete search history.

(56) References Cited

U.S. PATENT DOCUMENTS 4,636,847 A * 1/1987 Magi ..................... H01R 43/24
356/394
5,126,872 A * 6/1992 Birkle .................. G01N 21/952
356/24
(Continued)

FOREIGN PATENT DOCUMENTS

DE 19713973 A1 10/1998
EP 3109624 A1 12/2016
(Continued)

OTHER PUBLICATIONS

Machine level Espacenet translation of Rainer et al. (DE 19713973 A1).*

*Primary Examiner* — Mohammad J Rahman
(74) *Attorney, Agent, or Firm* — William J. Clemens; Shumaker, Loop & Kendrick, LLP

(57) ABSTRACT

An inspection device for inspecting a cable end of a cable, with and without a connected crimp contact, includes a mirror arrangement having a central axis along which the cable end can be arranged for inspection. The mirror arrangement includes a plurality of mirrors arranged at a predetermined angle to one another and at a predetermined angle to the central axis, each mirror viewing the cable end from a different angle. The inspection device includes a camera for generating images of the cable end from the different viewing angles of the mirrors. A transparent disk is arranged between the camera and the mirror arrangement to prevent dirt and/or dust from moving from the mirror arrangement to the camera. A compressed air cleaning device cleans the disk and/or the mirrors with compressed air ejected along the disk and/or along at least a part of the mirrors.

19 Claims, 8 Drawing Sheets

(51) Int. Cl.
*G06T 7/00* (2017.01)
*H01R 43/04* (2006.01)

(56) References Cited

U.S. PATENT DOCUMENTS

| | | | | |
|---|---|---|---|---|
| 5,212,880 | A * | 5/1993 | Nishiguchi | H01L 21/67144 |
| | | | | 29/739 |
| 5,293,220 | A * | 3/1994 | Fukuda | G01B 11/022 |
| | | | | 356/394 |
| 5,414,270 | A * | 5/1995 | Henderson | A24C 5/3412 |
| | | | | 209/236 |
| 5,619,792 | A * | 4/1997 | Ohmori | G01B 11/00 |
| | | | | 29/721 |
| 5,691,763 | A * | 11/1997 | Ichikawa | G01N 21/8806 |
| | | | | 348/125 |
| 5,993,305 | A * | 11/1999 | Chu | B24B 23/03 |
| | | | | 451/357 |
| 6,496,271 | B1 * | 12/2002 | Ngo | G01B 11/08 |
| | | | | 250/559.36 |
| 6,885,463 | B2 * | 4/2005 | Ngo | G01B 11/08 |
| | | | | 250/559.36 |
| 7,963,032 | B2 * | 6/2011 | Signer | H01R 43/005 |
| | | | | 29/593 |
| 8,640,326 | B2 * | 2/2014 | Yano | G01N 21/952 |
| | | | | 29/593 |
| 9,757,674 | B2 * | 9/2017 | Kwon | B01D 46/0086 |
| 2003/0146982 | A1 * | 8/2003 | Tindall | H04N 9/735 |
| | | | | 348/223.1 |
| 2004/0228601 | A1 * | 11/2004 | Porter | G02B 6/4207 |
| | | | | 385/139 |
| 2005/0223895 | A1 * | 10/2005 | Wong | B64D 37/32 |
| | | | | 95/148 |
| 2012/0047724 | A1 * | 3/2012 | Yano | G01N 21/952 |
| | | | | 29/705 |
| 2014/0057362 | A1 * | 2/2014 | Markovsky | G01N 21/78 |
| | | | | 436/171 |
| 2018/0356288 | A1 * | 12/2018 | Segall | G01J 5/0066 |
| 2019/0314845 | A1 * | 10/2019 | Rockle | B05B 12/30 |

FOREIGN PATENT DOCUMENTS

| | | |
|---|---|---|
| WO | 8905468 A1 | 6/1989 |
| WO | 2017033122 A1 | 3/2017 |
| WO | 2018113846 A1 | 6/2018 |

* cited by examiner

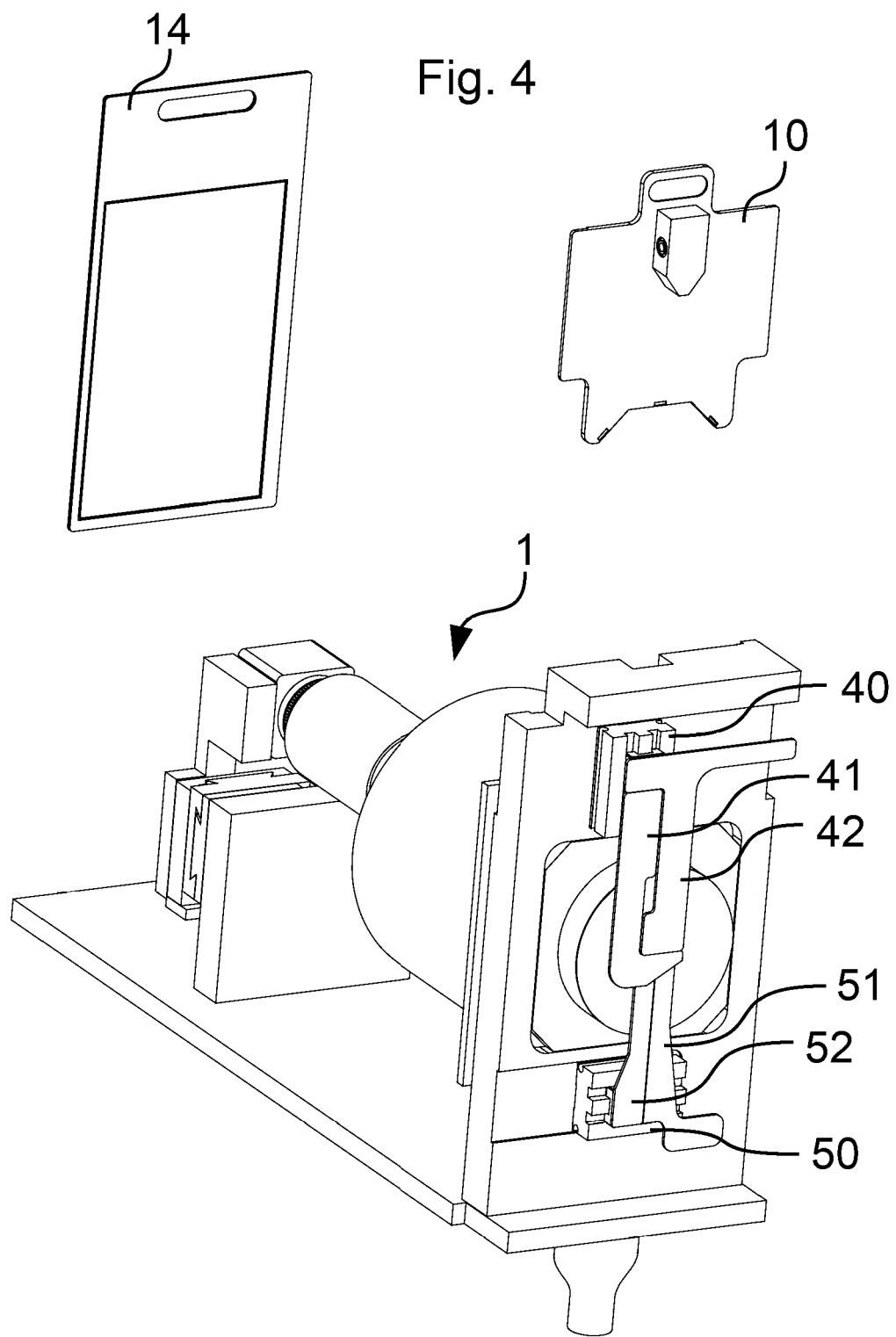

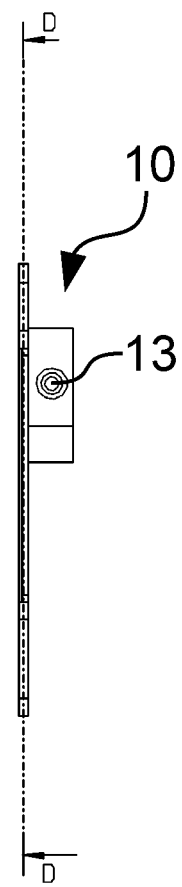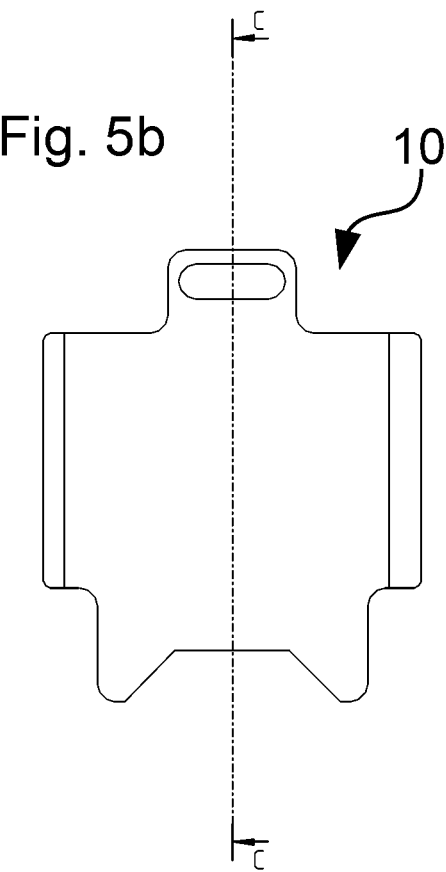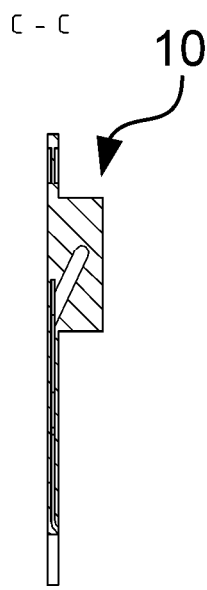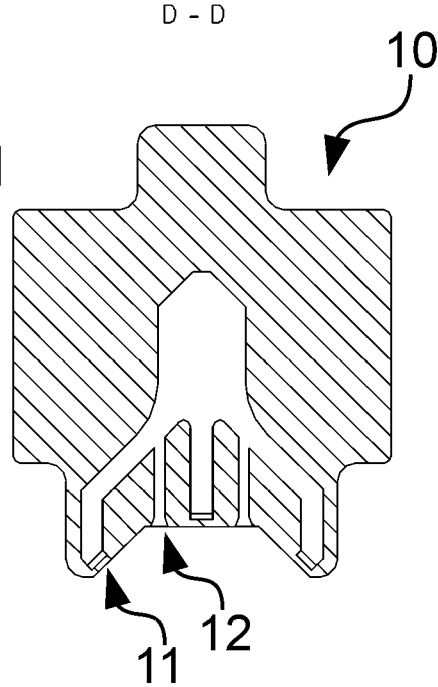

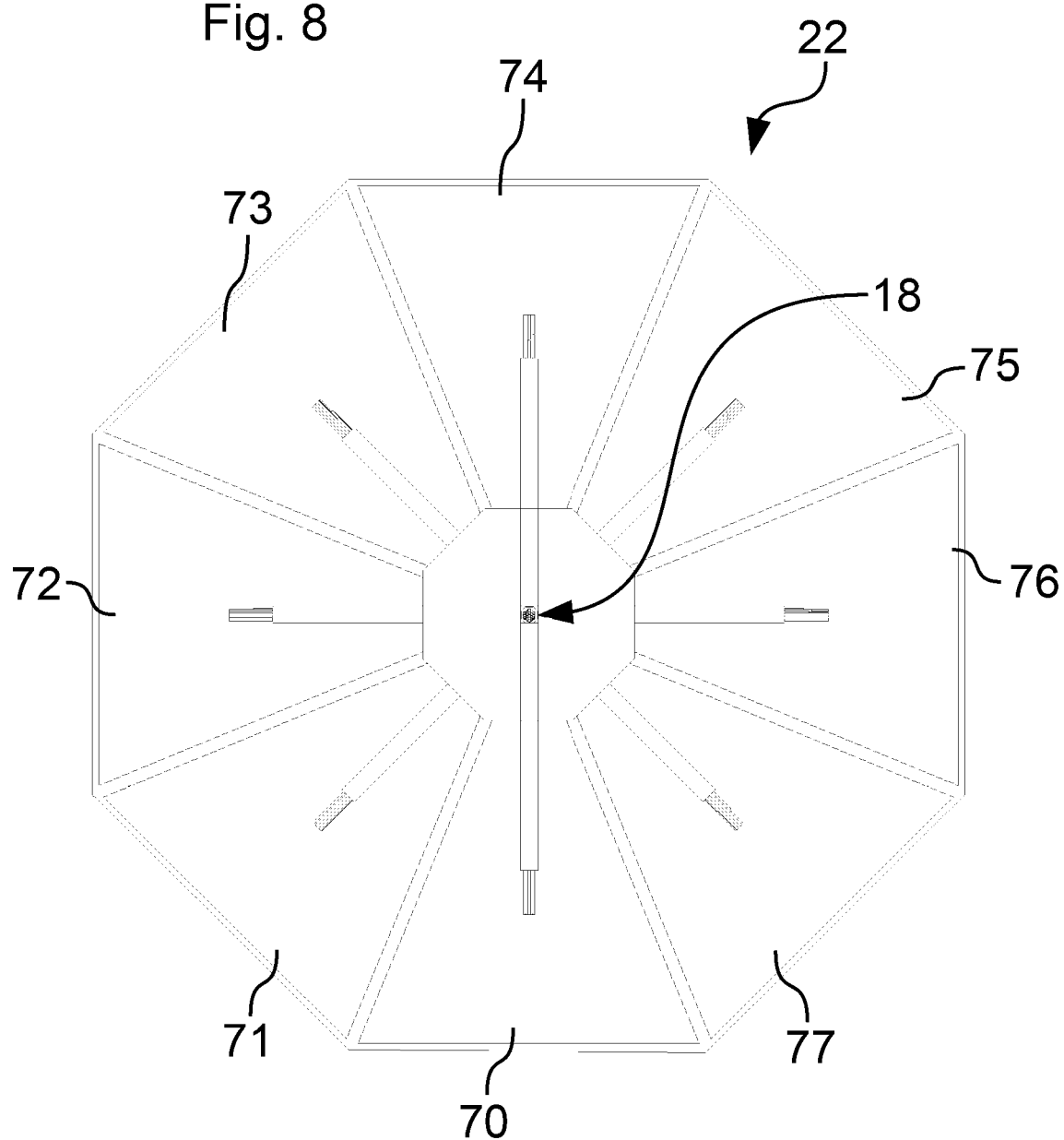

INSPECTION DEVICE FOR INSPECTING A CABLE END OF A CABLE AND A METHOD FOR CLEANING

FIELD

The present invention relates to an inspection device for inspecting a wire end of a cable and to a method for cleaning the mirror of an inspection device.

BACKGROUND

EP 3 109 624 A1 describes an inspection device for inspecting a cable end segment of a cable according to the prior art. The inspection device in EP 3 109 624 A1 comprises a camera, a lighting apparatus and a conical mirror collar (i.e. a conical arrangement of individual mirrors around a central axis). A cable end segment is inserted into the conical mirror collar, where a camera records the mirror images of the cable end, to inspect or quality check the cable end. This recording is evaluated with a software, i.e. the cable end is checked for its quality. The check takes place before and after crimping to inspect or verify the quality of the stripping and the connection of the crimp contact to the cable (i.e. the crimp connection). This can occur by introducing the cable end twice into an individual inspection device or be performed by means of two separate inspection devices.

One aspect of inspection devices to be considered is the contamination of parts of the inspection device, in particular the camera and/or the mirrors, with dirt and/or dust, in particular of the cable to be inspected, which contamination can lead to errors in the quality check by means of the camera. Without cleaning the camera and/or the mirrors, the inspection of the cable end by means of the inspection device under unfavorable circumstances is no longer reliably possible after only one day.

EP 3 109 624 A1 proposes to reduce the contamination by placing the members of the inspection device (i.e. camera, lighting apparatus and conical mirror collar) in a housing in which an overpressure is generated. This is intended to prevent the penetration of dirt particles into the housing.

Disadvantageous here is that the housing must essentially seal all members or parts of the inspection device (i.e. camera, lighting apparatus and conical mirror collar) in an airtight manner relative to the environment, which sealing is technically complex. In addition, the camera usually has to be calibrated repeatedly, for example regarding the color, which calibration is technically very complex with the inspection device from the prior art. In addition, once dirt and/or dust has entered into the inspection device, it can get to the camera and settle there, which means that, in some circumstances, the inspection of the cable end cannot be carried out reliably because the dirt and/or the dust will negatively affect the images recorded by the camera.

There may be, inter alia, a need for an inspection device for inspecting a cable end of a cable where contamination of parts of the inspection device is technically easily prevented and/or where parts of the inspection device can technically easily be cleaned of dirt and/or dust. In addition, there may also be a need, inter alia, for a method by means of which an inspection device for inspecting a cable end of a cable can be cleaned in a technically simple manner.

SUMMARY

Such a need may be met by an inspection device for inspecting a cable end of a cable and a method for cleaning the inspection device according to advantageous embodiments of the invention as described herein.

According to a first aspect of the invention, an inspection device is proposed for inspecting a cable end of a cable, in particular a processed cable, preferably of a cable connected to a crimp contact via a crimp connection, wherein the inspection device has a mirror arrangement having a central axis, wherein the cable end can be arranged along the central axis in the mirror arrangement for inspecting the cable end, wherein the mirror arrangement comprises a mirror collar comprising a plurality of mirrors arranged at a predetermined angle to each other and at a predetermined angle to the central axis for viewing the cable end arranged along the central axis of the mirror arrangement from different viewing angles, wherein the inspection device further comprises a camera for generating images of the cable end from different viewing angles by means of the mirrors, characterized in that the inspection device has a transparent disk which is arranged to prevent dirt and/or dust from getting from the mirror arrangement to the camera, in such a manner that the mirror arrangement is arranged on a first side of the disk and the camera is arranged on a second side of the disk opposite the first side, and in such a manner that the inspection device further has a compressed air cleaning device for cleaning the disk and/or the mirrors by means of compressed air, wherein the compressed air cleaning device is formed for ejecting the compressed air along the disk and/or along at least a part of the mirrors.

Advantageous here is that dirt and/or dust (in particular soot or similar, for example caused by laser cutting of the cable), which dirt and/or dust is or was introduced into the inspection device by the cable, cannot typically get to the camera due to the disk. Thus, this is generally protected from dirt or dust from the cable or the cable end in a technically simple manner. In addition, the disk and/or the mirrors can typically be technically cleaned quickly and simply.

According to a second aspect of the invention, a method for cleaning a mirror arrangement of an inspection device is proposed, wherein the mirror arrangement comprises a plurality of mirrors and/or a transparent disk of an inspection device, in particular an inspection device as described above, wherein the inspection device further comprises a camera for generating images of the cable end from different viewing angles by means of the mirrors, wherein the mirror arrangement comprises a plurality of mirrors arranged at a predetermined angle to each other and at a predetermined angle to a central axis of the mirror arrangement for viewing the cable end arranged along the central axis of the mirror arrangement from different viewing angles, wherein the transparent disk is arranged to prevent dirt and/or dust from getting from the mirror arrangement to the camera in such a manner that the mirror arrangement is arranged on a first side of the disk and the camera is arranged on a second side of the disk opposite the first side, wherein the method comprises the following step: ejecting compressed air from a compressed air cleaning device along the disk and/or along at least a part of the mirror for removing dust and/or dirt from the disk and/or mirrors.

Advantageous in this method is that a disk that keeps dirt and/or dust (especially soot or similar, for example caused by laser cutting of the cable), which dirt and/or dust is or was introduced by the cable into the inspection device, away from the camera, is typically technically simply and quickly cleaned. In addition, the mirrors are usually technically simply and quickly cleaned.

Possible features and advantages of embodiments of the invention may be considered, inter alia and without limiting the invention, to be dependent upon the concepts and findings described below.

According to one embodiment, the inspection device is formed in such a manner that the compressed air cleaning device can be removed from the inspection device and inserted again into the inspection device without opening a housing of the inspection device, which housing protects the area on the first side and/or the second side of the disk against the penetration of dirt and/or dust from the environment. Advantageous here is that typically no more dirt or filth gets into the housing or the mirror arrangement during removal or insertion. In addition, the compressed air cleaning device can generally be technically easily replaced by another apparatus.

According to one embodiment, the inspection device is formed in such a manner that, when the compressed air cleaning device is inserted into the inspection device or the compressed air cleaning device is arranged in the inspection device, a compressed air channel, arranged in a stationary manner with respect to the inspection device, for supplying the compressed air cleaning device with compressed air, is fluidly connected to the compressed air cleaning device. Thereby, the compressed air supply can usually be technically simply connected to the compressed air cleaning device in such a manner that compressed air gets into the compressed air cleaning device through the compressed air supply. Consequently, the compressed air cleaning device typically does not need to have an active member. Thus, the compressed air cleaning device can usually be formed technically particularly simply, reliably and economically.

According to one embodiment, the compressed air ejected from the compressed air cleaning device is ionized compressed air. Advantageous here is that in general the cleaning effect or cleaning performance of the compressed air cleaning device is particularly high.

According to one embodiment, the inspection device is formed in such a manner that a cable receiving aperture for inserting the cable end into the mirror arrangement along the central axis can be closed by a cable centering for holding the cable except for an aperture of the cable centering for receiving and holding the cable. As a result, the compressed air ejected by the compressed air cleaning device can typically be guided technically simply in the mirror arrangement in such a manner that the compressed air, after flowing along a first mirror, is deflected at the cable receiving aperture, so that after deflection the compressed air flows along at least one further second mirror.

According to one embodiment, the inspection device is formed in such a manner that a calibration member, in particular a gray card, for calibrating the camera without opening a housing of the inspection device, which housing protects the area on the first side and/or the second side of the disk against the penetrating of dirt and/or dust from the environment, is insertable into the inspection device, in particular on the first side of the disk, preferably into an aperture for receiving the compressed air cleaning device, in such a manner that at least one part of the mirrors, in particular all the mirrors, of the mirror arrangement are concealed by the calibration member when viewed from the viewing direction of the camera. This generally allows the camera to be calibrated without dust and/or dirt getting into the mirror arrangement via opening of the housing. In particular, if a color camera is used as a camera, the camera should typically be calibrated for color at regular intervals. The gray card can typically be inserted into the same recess of the inspection device into which the compressed air cleaning device can be inserted or introduced. This usually prevents dust and/or dirt from penetrating the mirror arrangement even more efficiently, since the aperture for receiving the compressed air cleaning device or the calibration member can be closed at any time, either by the compressed air cleaning device when no calibration needs to be performed, or by the calibration member when a calibration procedure is currently being performed.

According to one embodiment, the inspection device has also a discharge aperture for discharging the compressed air from an interior of the mirror arrangement, wherein in particular the discharge aperture is arranged with respect to the central axis opposite the compressed air cleaning device. The advantage of this is that the compressed air, together with dust and/or dirt, can typically be technically simply conveyed out of the mirror arrangement or the inspection device. This generally increases the cleaning efficiency of the compressed air.

According to one embodiment, the compressed air cleaning device is formed in such a manner that the compressed air cleaning device ejects the compressed air for cleaning the mirrors in the direction of a cable receiving aperture for inserting the cable end into the mirror arrangement. It is advantageous that the mirrors can usually be cleaned technically simply and efficiently, since the compressed air is deflected when the cable receiving aperture is closed and can flow along another mirror, in particular in the direction of the discharge aperture (if present).

According to one embodiment, the compressed air cleaning device is produced in one piece, in particular by means of a metal printing method and/or 3D printing. The advantage of this is that the compressed air cleaning device is usually particularly economical and easy to handle.

According to one embodiment, the compressed air cleaning device is formed in several parts and/or is produced by means of a casting method. As a result, the inspection device can generally be produced particularly economically.

According to one embodiment, the compressed air cleaning device has a plurality of compressed air guide channels for guiding the compressed air in the compressed air cleaning device, wherein when the compressed air cleaning device is inserted or arranged in the inspection device, two of the compressed air guide channels for ejecting the compressed air are arranged along the disk and three of the compressed air guide channels for ejecting the compressed air are arranged along one or a plurality of mirrors of the mirror arrangement. The advantage of this is that it is usually technically simple for the disk and the mirrors to be cleaned at the same time. The compressed air can usually be ejected in particular along a plurality of in particular directly adjacent mirrors, so that multiple mirrors can be cleaned at the same time.

According to one embodiment, the disk consists of breakproof glass and/or break-proof plastics material. This usually makes the inspection device particularly stable. Destruction or damage of the disk is essentially typically prevented by this.

According to one embodiment, the inspection device further has a lighting device for lighting the cable end arranged along the central axis, wherein the lighting device has multiple lighting means arranged along an ellipse, in particular along a circle, wherein the lighting means each have a main emission direction that is directed away from the mirror arrangement, and a reflector for reflecting the light emitted by the lighting means. This usually allows the cable end to be illuminated without shadows and/or shiny spots.

According to one embodiment, the reflector has the shape of a paraboloid of revolution. An advantage of this is typically that the cable end can be illuminated particularly evenly.

It should be noted that some of the possible features and advantages of the invention are described herein with reference to different embodiments of the inspection device. A person skilled in the art recognizes that the features can be combined, adapted or replaced as appropriate in order to obtain further embodiments of the invention.

Embodiments of the invention will be described in the following with reference to the accompanying drawings, wherein neither the drawings nor the description are intended to be interpreted as limiting to the invention.

DESCRIPTION OF THE DRAWINGS

FIG. 3b shows a cross-section view of the inspection device from FIG. 1 or FIG. 2a or FIG. 2b along the line B-B of FIG. 3a;

FIG. 4 shows a perspective view of the inspection device from FIG. 1 or FIG. 2a or FIG. 2b or FIG. 3a or FIG. 3b with the unplugged gray card and the unplugged compressed air cleaning device;

FIG. 5a shows a side view of the compressed air cleaning device;

FIG. 5b shows a front view of the compressed air cleaning device;

FIG. 5c shows a cross-section view of the compressed air cleaning device along line C-C of FIG. 5b;

FIG. 5d shows a cross-section view of the compressed air cleaning device along line D-D of FIG. 5a;

FIG. 8 shows an image of the cable end recorded with the inspection device from FIG. 1-4 or FIG. 6.

The figures are merely schematic and not to scale. Like reference signs refer to like or equivalent features in the various drawings.

DETAILED DESCRIPTION

Figure 1:
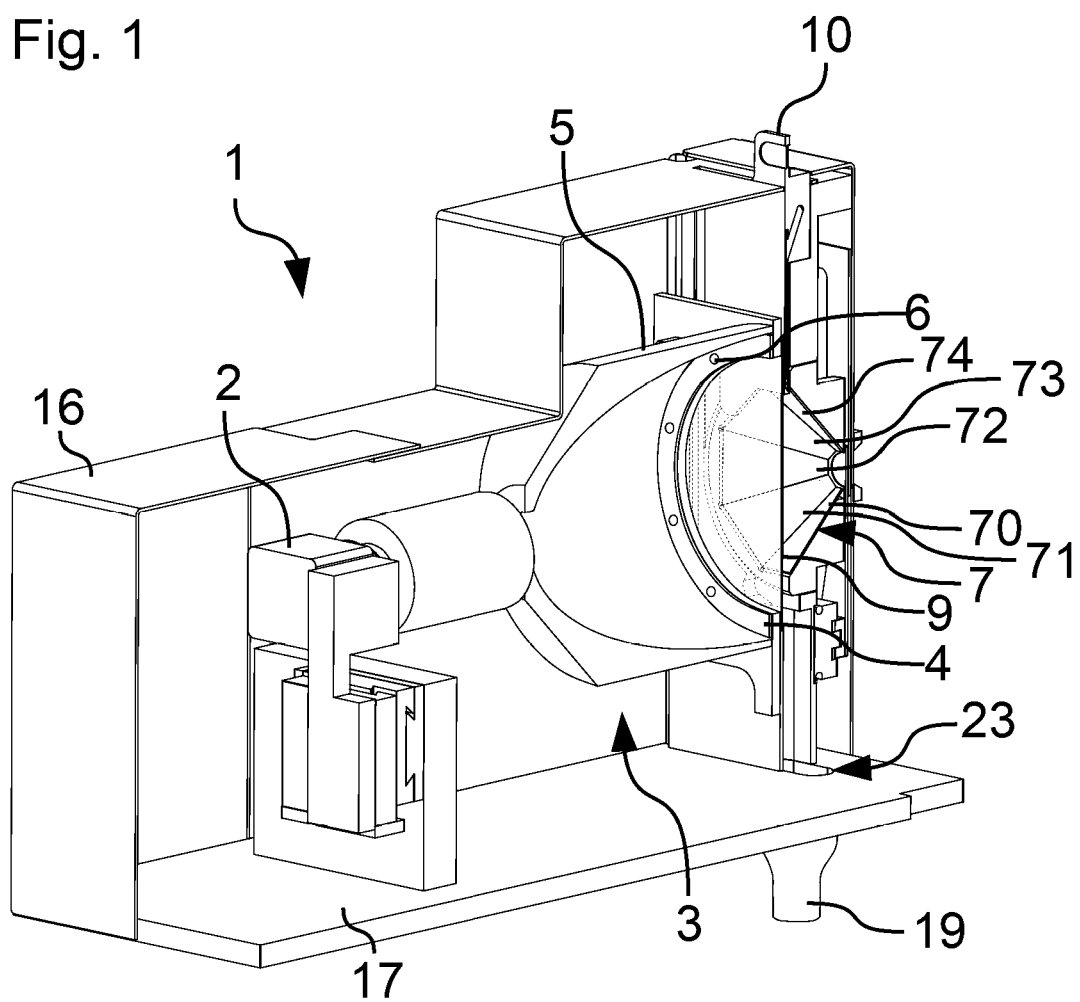
FIG. 1 shows a perspective partially cutaway view of an embodiment of the inspection device according to the invention.
Figure 2A:
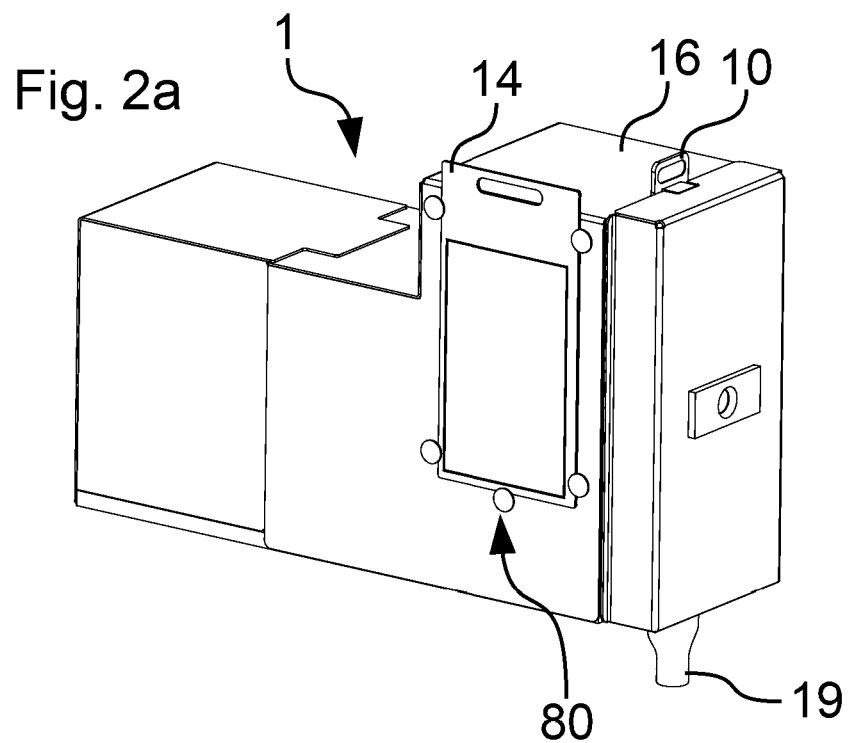
FIG. 2a shows a perspective view of the inspection device from FIG. 1 with a housing or cover.
Figure 2B:
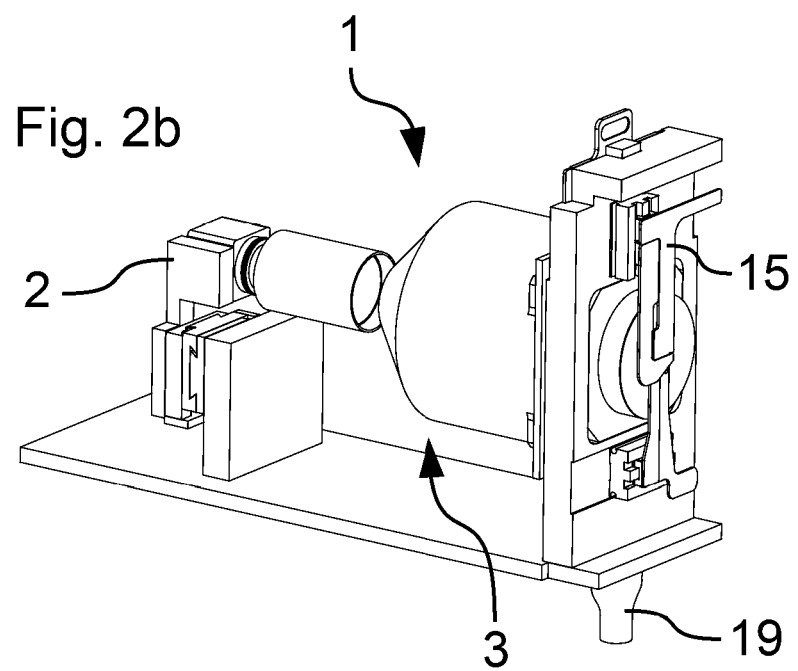
FIG. 2b shows a perspective view of the inspection device from FIG. 1 or FIG. 2a without a housing or cover.
Figure 3A:
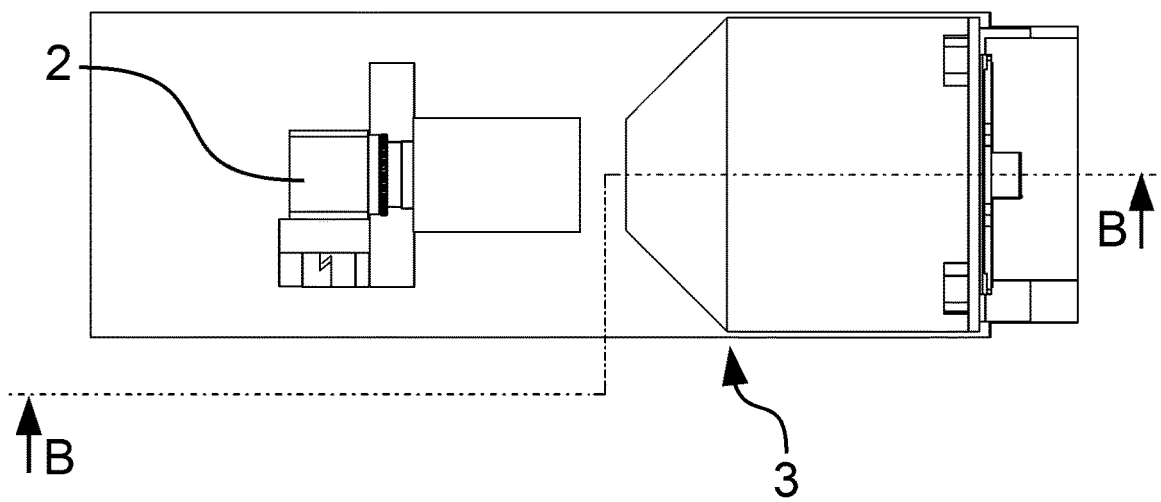
FIG. 3a shows the cutting line B-B of the cross-section view of FIG. 3b.
Figure 3B:
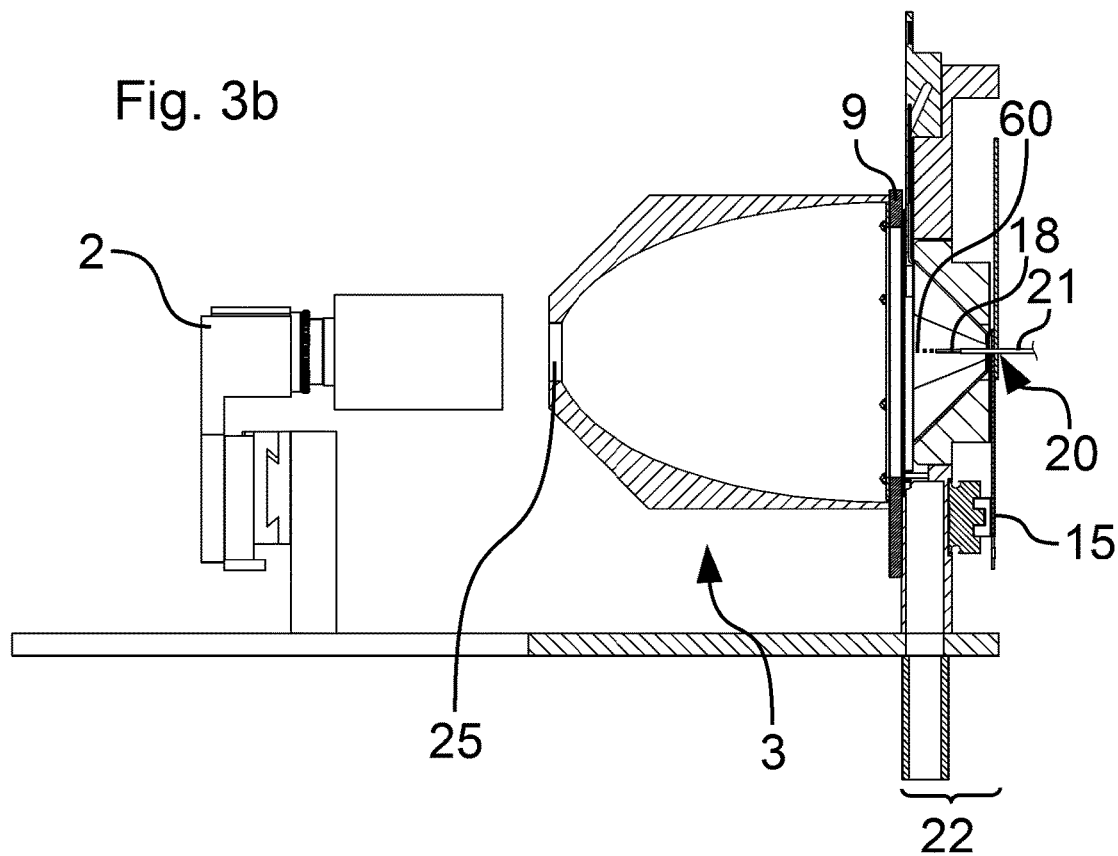

FIG. 1 shows a perspective partially cutaway view of an embodiment of the inspection device 1 according to the invention. FIG. 2a shows a perspective view of the inspection device 1 from FIG. 1 with a housing 16 or cover. FIG. 2b shows a perspective view of the inspection device 1 from FIG. 1 or FIG. 2a without the housing 16 or cover. FIG. 3a shows the cutting line B-B of the cross-section view of FIG. 3b. FIG. 3b shows a cross-section view of the inspection device 1 from FIG. 1 or FIG. 2a or FIG. 2b along the line B-B of FIG. 3a.

The inspection device 1 is formed for inspecting or examining a cable end 18 or a cable end of a cable 21. For this purpose, the inspection device 1 has a mirror arrangement 22, a lighting device 3 and a camera 2. These members are arranged on a base plate 17.

The cable 21 or cable end 18 is inserted into the mirror arrangement 22 along a central axis 60 of the mirror arrangement 22, which axis extends horizontally, through a cable receiving aperture 20. The cable 21 is held in this position by means of a cable centering 15.

As shown in FIG. 4, the cable centering 15 has a first vertically movable parallel gripper 40, which first gripper can move two clamping plates 41, 42 towards each other, and a second horizontally movable parallel gripper 50, which second gripper can also move two clamping plates 51, 52 towards each other. The cable 21 is held and centered at the same time by the four clamping plates 41, 42, 51, 52, so that the cable 21 or the cable end 18 in the mirror arrangement 22 extends along the central axis 60.

The mirror arrangement 22 comprises multiple mirrors 70-77 (FIG. 1 and FIG. 8) in the shape of a mirror collar 7 around the central axis 60 or the cable end 18.

The mirrors 70-77 of the mirror arrangement 22 are arranged at an equal angle to each other and surround the central axis 60 completely. For example, the mirror arrangement 22 can comprise eight mirrors 70-77, so that each mirror 70-77 is aligned at an angle of 360°/8=45° to the immediately adjacent mirror 70-77. It is also conceivable that the mirror arrangement 22 comprises only five or six mirrors, which mirrors completely surround the cable end 18.

In addition, the mirrors 70-77 are arranged in such a manner that they are conically tapered towards the cable receiving aperture 20, i.e. the distance between the mirrors 70-77 and the central axis 60 becomes smaller the more one moves towards the cable receiving aperture 20.

The mirrors 70-77 each have an angle of approx. 45° to the central axis 60. The mirrors 70-77 are each trapezoidally formed in plan view.

One or a plurality of the mirrors 70-77 can each have distance markings to serve as a reference for measurement operations in the evaluation of the images recorded by the camera 2.

The mirror arrangement 22, the disk 9 and the cable centering 15, which components almost completely close the cable receiving aperture 20, together limit the interior or the inner space of the mirror arrangement 22.

The lighting device 3 comprises a reflector 5 in the shape of a paraboloid of rotation, which reflector has a viewing aperture 25 for the camera 2. In FIG. 3b the viewing aperture 25 is located on the left side, i.e. the side of the reflector 5 facing away from the mirror arrangement 22.

The lighting device 3 also comprises a ring lamp 4. The ring lamp 4 is arranged at the inner edge of the reflector 5 at the end facing the mirror arrangement 22 (in FIG. 3b the right end) of the reflector 5. The ring lamp 4 is formed as a circular disk and has multiple lighting means 6, for example LEDs that are arranged evenly distributed over the circumference of the ring lamp 4. The lighting means 6 are arranged in such a manner that their main emission direction is parallel to the central axis 60 away from the mirror arrangement 22. The emitted light thus reaches the reflector 5 and then to the cable end 18, which is lit or illuminated from many sides.

The reflector 5 or the inner surface of the reflector 5 may be made of a white plastics material (for example polytetrafluoroethylene (PTFE) or polyoxymethylene (POM)) and/or have a white surface or paint layer. The inner surface, formed for reflecting the light from the lighting means 6, is roughly designed to achieve a good scattering of the light. The inner surface of the reflector 5 is particularly sensitive to dirt due to its roughness and due to its function as a reflective surface. It is therefore particularly important to keep dirt away from the inner surface of the reflector 5. The lighting means 6 all beam in the direction of the reflector 5.

The viewing direction of the camera 2 extends along the central axis 60. The camera 2 records images or recordings of the cable end 18 from different viewing angles via reflections of the mirrors 70-77, which mirrors are arranged around the cable end 18. The number of viewing angles depends on the number of mirrors 70-77. It is also possible for the camera 2 to record only one image, which image is divided into multiple images, namely one image per mirror 70-77. It is also possible that for each mirror 70-77 a separate image is recorded by the camera 2.

The camera 2 is connected to an evaluation system (not shown). The evaluation system comprises, for example, a computer with evaluation software, wherein the evaluation software analyses the images of the cable end 18 from the different viewing angles. The evaluation software can comprise or be an image recognition software. The evaluation software can recognize for example irregularities and/or asymmetries and/or other errors, such as pulled out and/or spread strands of the cable 21 or the cable end 18. If one or more errors and/or quality defects have been recognized by the evaluation software, a corresponding error message can be generated. Upon the error message, the cable 21 can be disposed of as scrap, the production of further cables can be stopped temporarily until a manual release or similar. Also, a pure record of the determined variables can take place.

The cable 21 can be checked and/or inspected and/or examined before and/or after processing the cable 21 with a cable processing machine (for example a crimping machine) by means of the inspection device 1 in order to determine any changes made to the cable 21 by the cable processing machine.

The camera 2 can be a digital photo camera or a digital video camera.

Between the reflector 5 and the mirror arrangement 22 a transparent disk 9 is arranged, which disk extends perpendicular to the central axis 60. The disk 9 separates, in particular in an essentially airtight manner, the mirror arrangement 22 from the reflector 5 and the camera 2. Thus, no dirt and/or filth from the mirror arrangement 22 or from the cable 21 or the cable end 18 can get into the reflector 5 and/or reach the camera 2. The mirror arrangement 22 and the reflector 5/camera 2 are thus located on two opposite sides of the disk 9.

A housing 16 of the inspection device 1 encloses the components or constituent parts of the inspection device 1 (i.e. camera 2, reflector 5, disk 9 and mirror arrangement 22) so that they are protected from dust and/or dirt. When the housing 16 is closed, only the cable receiving aperture 20 remains, through which aperture dust and/or dirt can penetrate the inspection device 1.

FIG. 4 shows a perspective view of the inspection device 1 from FIG. 1 or FIG. 2a or FIG. 2b or FIG. 3a or FIG. 3b with the unplugged gray card 14 and the unplugged compressed air cleaning device 10. FIG. 5a shows a side view of the compressed air cleaning device 10. FIG. 5b shows a front view of the compressed air cleaning device 10. FIG. 5c shows a cross-section view of the compressed air cleaning device 10 along the line C-C of the FIG. 5b. FIG. 5d shows a cross-section view of the compressed air cleaning device 10 along the line D-D of the FIG. 5a.

The inspection device 1 additionally comprises a compressed air cleaning device 10. The compressed air cleaning device 10 is formed for cleaning the disk 9 and the mirror arrangement 22 from dirt and/or filth by means of compressed air. For example, the cable 21 can be stripped with a laser, which laser may produce soot particles that can also stick to the cable end 18 and were not removed before the introduction of the cable end 18 into the inspection device 1.

The compressed air cleaning device 10 can be introduced into a recess at the top side of the inspection device 1 to be inserted and removed. For insertion, the compressed air cleaning device 10 is pushed from top to bottom between the disk 9 and the mirror collar 7 or mirror arrangement 22. The multiple outlets 11, 12 of the compressed air cleaning device 10 protrude minimally over the edge of the mirror collar 7 and are aligned parallel to the surfaces of the mirrors 70-77 and/or to the surface of the disk 9.

The compressed air cleaning device 10 serves for cleaning the disk 9 and the mirrors 70-77 using compressed air. If the compressed air cleaning device 10 is inserted into the inspection device 1, the compressed air cleaning device 10 or the outlets 11, 12 of the compressed air cleaning device 10 are fluidly connected to a compressed air channel 13 (FIG. 5a) arranged in a stationary manner. When removing the compressed air cleaning device 10 from the inspection device 1, the fluid connection is separated again. An air supply channel of the compressed air cleaning device 10 which is located in a side area of the compressed air cleaning device 10 can have a seal for airtight connection to the compressed air channel 13 arranged in a stationary manner. Via the compressed air channel 13, compressed air or air is introduced into the compressed air cleaning device 10.

The compressed air cleaning device 10 has a plurality of compressed air guide channels for guiding the compressed air in the compressed air cleaning device 10 or for ejecting the compressed air or air from the compressed air cleaning device 10 in different directions.

A part of the compressed air is ejected from the compressed air cleaning device 10 along the disk 9 from top to bottom. For this purpose, the two second outermost compressed air channels with outlets 12 in FIG. 5d extend from top to bottom, i.e. the respective aperture points downwards.

Three of the compressed air channels of the compressed air cleaning device 10, in FIG. 5d the two outer compressed air channels and the middle compressed air channel (with outlets 11), are each formed along a mirror 70-77 for ejecting the compressed air. The compressed air from each of these three compressed air channels is thus ejected in the direction of the cable receiving aperture 20. When the cable receiving aperture 20 is closed by the cable centering 15 except for an aperture for receiving or holding the cable 21, the compressed air or air is then "reflected" by the cable centering 15 and then flows along a mirror 70-77 or a plurality of mirrors 70-77 in the lower half of the mirror arrangement 22 or along a mirror 70-77 or a plurality of mirrors 70-77 extending from top to bottom as one moves away from the cable receiving aperture 20 from the disk 9.

The compressed air in the compressed air cleaning device 10 is divided into forks by means of the compressed air channels.

The ejection of compressed air by the compressed air cleaning device 10 can be performed continuously.

It is however also possible that the compressed air is not ejected continuously, but only periodically. The time periods between the ejection of the compressed air and the length of the ejection of the compressed air can be predetermined or depend on the strength or presence of contamination of the mirror arrangement 22 and/or disk 9.

On the bottom side, the inspection device 1 has a discharge aperture 23. The air ejected by the compressed air cleaning device 10, which has flowed along the disk 9 or along the mirrors 70-77, can exit the mirror arrangement 22 through the discharge aperture 23. This allows the dust and/or dirt that has been removed from the mirrors 70-77 and/or the disk 9 and is now in the air to be removed from the mirror arrangement 22. It is possible for the air to be actively sucked out of the mirror arrangement 22 through the discharge aperture 23 by means of an air suction and a corresponding port 19.

The compressed air cleaning device 10 can be removed or taken out of the inspection device 1. For this purpose, the compressed air cleaning device 10 in FIG. 3b is pulled out upwards from the recess retaining the compressed air cleaning device 10. By pulling out or moving the compressed air cleaning device 10 upwards, the connection between the stationary compressed air channel 13 and the compressed air cleaning device 10 is separated.

FIG. 4 shows the inspection device 1 without a cover or with removed cover and the removed compressed air cleaning device 10 as well as a gray card 14.

The camera 2 of the inspection device 1 must be recalibrated at intervals. In particular if the camera 2 is a color camera, then the color camera has to be recalibrated from time to time with regard to the color. The calibration is performed by means of a calibration member which is inserted into the inspection device 1 in such a manner that the camera 2 no longer sees the mirror arrangement 22, but instead the calibration member is in the field of vision of the camera 2.

The calibration member can be a gray card 14, i.e. a flat card rectangular in plan view, where a rectangular calibration area 30 (FIG. 7) has a surface in a precisely defined gray tone.

Figure 6:
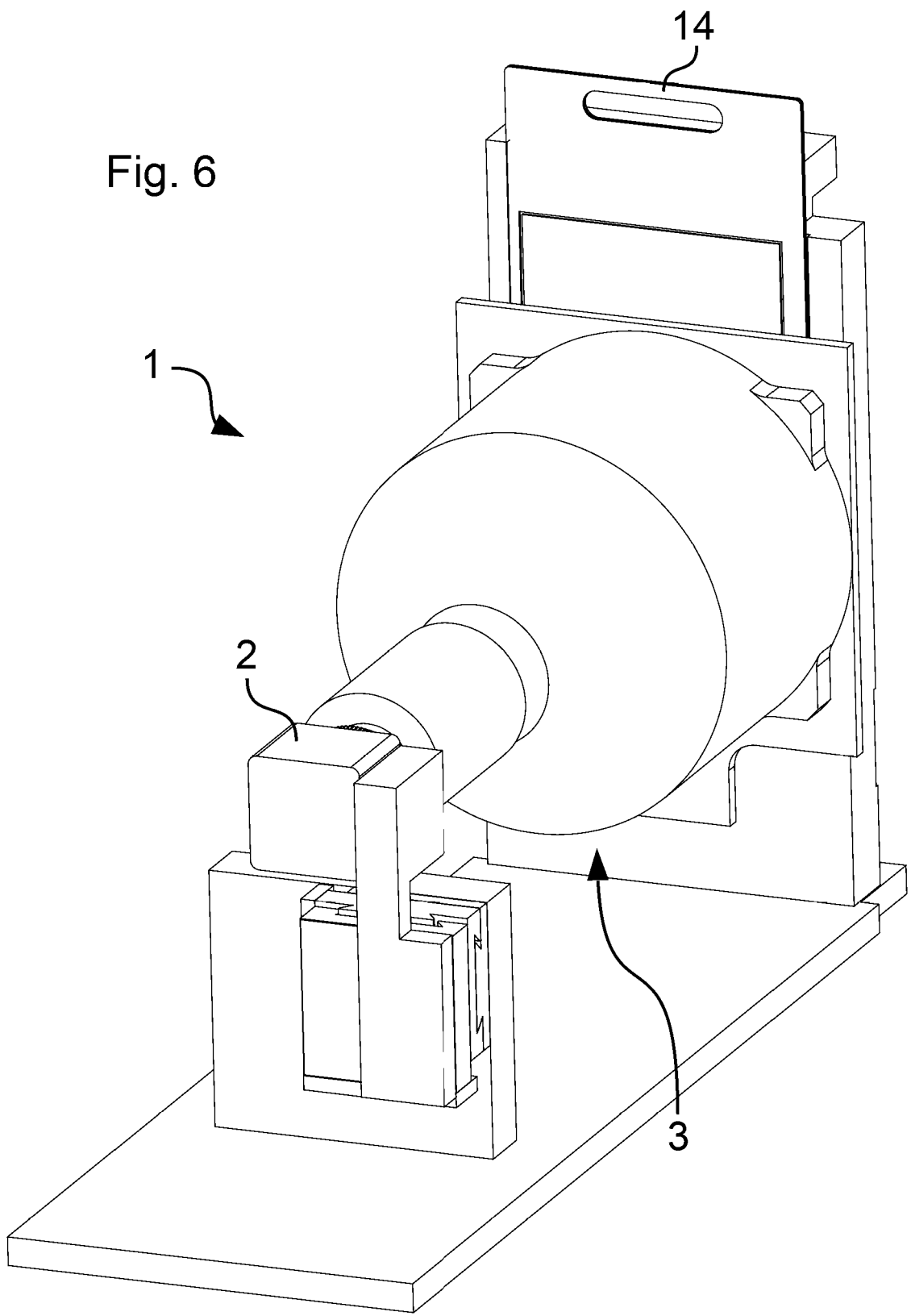
FIG. 6 shows a perspective view of the inspection device from FIG. 1 or FIG. 2a or FIG. 2b or FIG. 3a or FIG. 3b or FIG. 4 without a housing or cover with the plugged-in gray card.
Figure 7:
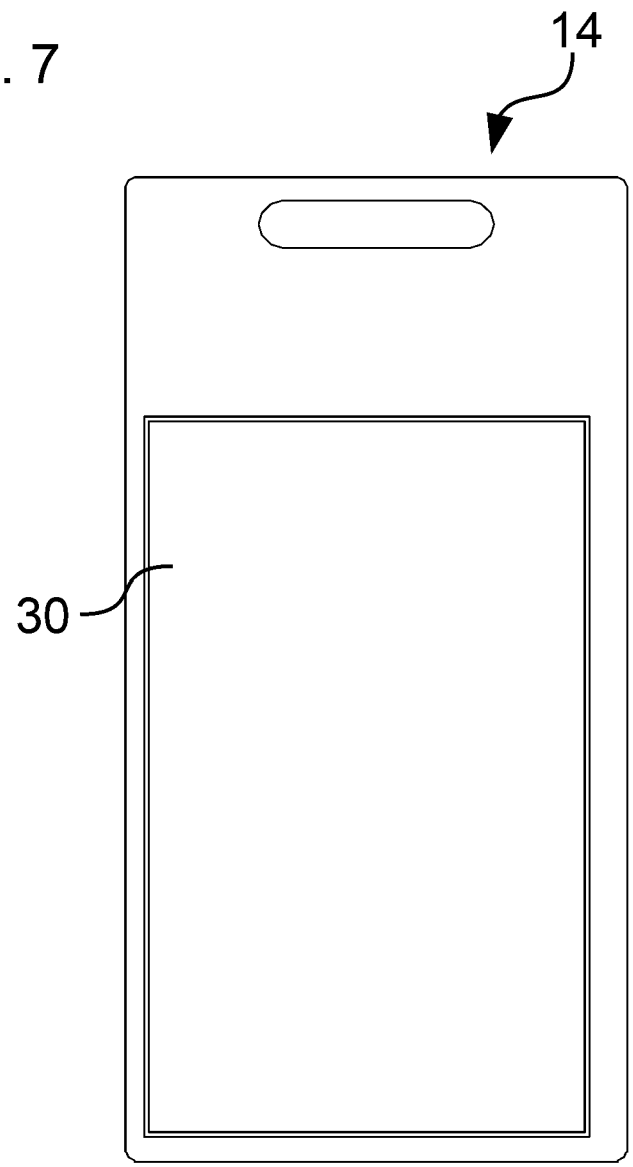
FIG. 7 shows a front view of the gray card of the inspection device from FIG. 2a or FIG. 4 or FIG. 6.

FIG. 6 shows a perspective view of the inspection device 1 from FIG. 1 or FIG. 2a or FIG. 2b or FIG. 3a without the housing 16 or cover with the plugged-in grey card 14. FIG. 7 shows a front or plan view of the gray card 14 of the inspection device 1 from FIG. 1.

The gray card 14 is plugged or introduced into the same recess into which the compressed air cleaning device 10 can be introduced or from which the compressed air cleaning device 10 was previously taken out. The gray card 14 is or can be introduced into the compressed air cleaning device recess to such an extent that the area through which the camera 2 sees the mirrors 70-77 of the mirror arrangement 22 or the cable end 18 is completely covered by the gray card 14 or the calibration area 30 of the gray card 14.

This means that at the point where the cable end 18 was visible to the camera 2 via the reflections of the mirrors 70-77, the gray card 14 or the calibration area 30 for the camera 2 can now be seen. The camera 2 can now be calibrated or adjusted in color using the familiar color tone of the calibration area 30.

The gray card 14 has an oval recess in the top area of the gray card 14 for easier removal of the gray card 14 from the inspection device 1.

The housing 16 has a bracket 80 on its outside to hold the gray card 14 when the gray card 14 is not plugged into the inspection device 1 or being used. The bracket 80 can comprise five circular disks projecting from the housing 16.

FIG. 8 shows an image of the cable end 18 recorded with the inspection device 1 from FIG. 1-4 or FIG. 6. In FIG. 8, eight mirrors 70-77 are arranged in such a manner that the mirrors 70-77 are each arranged on the clock hand positions of six o'clock, half past seven, nine o'clock, half past ten, twelve o'clock, half past one, three o'clock, half past four. In FIG. 8, it is easy to recognize how the eight mirrors 70-77 of the mirror arrangement 22 provide/give different views of the cable end 18 or the cable 21 or views from different viewing angles. In the reflection or mirroring of the cable end 18 of the right mirror 76 ("at three o'clock") and of the left mirror 72 ("at nine o'clock"), it can clearly be seen that one of the strands of the cable 21 or the cable end 18 is cut too short. In the remaining reflections or mirrorings of the other mirrors 70, 71, 73, 74, 75, 77 this is harder to recognize or determine.

These irregularities of the strands can be detected by the evaluation software and the cable 21 can be marked as faulty and/or sorted out directly as scrap.

Other errors which can be easily detected or inspected technically by the inspection device 1 are, inter alia, that a strand of the cable 21 is pulled out, that a strand of the cable 21 is spread, that the cut made for stripping the cable 21 has led to an uneven stripping edge, that the strands of the cable 21 have been cut obliquely, that a strand of the cable 21 has not been crimped with a crimp contact, whether strands extend parallel to one another in a control drilling of the cable 21, whether a contact member, for example a crimp member, which has been connected to the cable 21, extends completely along the central axis 60 or not (or is bent).

Finally, it should be noted that terms such as "have", "comprising", etc. do not exclude any other elements or steps and terms such as "an" or "a" do not exclude any plurality. Further, it should be noted that features or steps which have been described with reference to one of the above embodiment examples can also be used in combination with other features or steps of other embodiment examples described above.

In accordance with the provisions of the patent statutes, the present invention has been described in what is considered to represent its preferred embodiment. However, it should be noted that the invention can be practiced otherwise than as specifically illustrated and described without departing from its spirit or scope.

LIST OF REFERENCE SIGNS

1 Inspection device
2 Camera
3 Lighting device
4 Ring lamp
5 Reflector
6 Lighting means
7 Mirror collar
9 Disk
10 Compressed air cleaning device
11 Outlet for cleaning the mirrors
12 Outlet for cleaning the disk
13 Compressed air channel
14 Gray card
15 Cable centering
16 Housing (cover)
17 Base plate
18 Cable end
19 Port for air suction 20 Cable receiving aperture
21 Cable
22 Mirror arrangement
23 Discharge aperture
25 Viewing aperture of the reflector
30 Calibration area
40 First parallel gripper
41, 42 Clamping plates of the first parallel gripper
50 Second parallel gripper
51, 52 Clamping plates of the second parallel gripper
60 Central axis
70-77 Mirror
80 Bracket for gray card

What is claimed is:

1. An inspection device for inspecting a cable end of a cable comprising:
   a mirror arrangement having a central axis, wherein the cable end is arranged along the central axis in the mirror arrangement for inspecting the cable end;
   wherein the mirror arrangement includes a plurality of mirrors arranged at a predetermined first angle to each another and at a predetermined second angle to the central axis, each of the mirrors viewing the cable end from a different viewing angle;
   a camera generating images of the cable end from the different viewing angles from the mirrors;
   a transparent disk arranged to prevent dirt and/or dust from moving from the mirror arrangement to the camera, the mirror arrangement being arranged on one side of the disk and the camera being arranged on an opposite side of the disk; and
   a cleaning device for cleaning at least one of the disk and the mirrors with compressed air, the cleaning device having at least one outlet ejecting the compressed air along at least one of the disk and at least a part of the mirrors, the cleaning device being insertable into an aperture in the inspection device and thereby positioned between the transparent disk and the mirror arrangement.

2. The inspection device according to claim 1 wherein the cleaning device is selectively removable from and insertable into the inspection device without opening a housing of the inspection device, the housing enclosing the mirror arrangement and the disk.

3. The inspection device according to claim 1 including a stationary compressed air channel for supplying the compressed air to the cleaning device when the cleaning device is fluidly connected to the compressed air channel.

4. The inspection device according to claim 1 wherein the ejected compressed is air ionized compressed air.

5. The inspection device according to claim 1 including a cable receiving aperture aligned with the central axis for inserting the cable end into the mirror arrangement and a cable centering for holding the cable, wherein the cable centering closes the cable receiving aperture except for an aperture of the cable centering for receiving and holding the cable.

6. The inspection device according to claim 1 including a calibration member insertable into the inspection device for calibrating the camera without opening a housing of the inspection device, the housing enclosing the mirror arrangement, the camera and the disk, wherein the calibration member when inserted is positioned on the one side of the disk to cover the mirrors when viewing the mirrors from a viewing direction of the camera.

7. The inspection device according to claim 6 wherein the calibration member is a gray card.

8. The inspection device according to claim 6 wherein the calibration member is insertable into the aperture in the inspection device for receiving the cleaning device.

9. The inspection device according to claim 1 including a discharge aperture for discharging the compressed air from an interior of the mirror arrangement.

10. The inspection device according to claim 9 wherein the discharge aperture is arranged opposite the cleaning device relative to the central axis.

11. The inspection device according to claim 1 wherein the cleaning device is adapted to eject the compressed air for cleaning the mirrors toward a cable receiving aperture for inserting the cable end into the mirror arrangement.

12. The inspection device according to claim 1 wherein the cleaning device is formed as one piece by at least one of a metal printing method and 3D printing.

13. The inspection device according to claim 1 wherein the cleaning device is formed by at least one of a plurality of parts and a casting process.

14. The inspection device according to claim 1 wherein the cleaning device has a plurality of compressed air guide channels for guiding the compressed air, wherein when the cleaning device is inserted into the inspection device, two of the compressed air guide channels are arranged to guide a portion of the compressed air along the disk and three of the compressed air guide channels are arranged to guide another portion of the compressed air along the mirrors of the mirror arrangement.

15. The inspection device according to claim 1 wherein the disk is formed of at least one of a break-proof glass and a break-proof plastics material.

16. The inspection device according to claim 1 including a lighting device for lighting the cable end in the mirror arrangement, wherein the lighting device has multiple lighting means arranged along an ellipse, each of the lighting means having a main emission direction directed away from the mirror arrangement, and including a reflector reflecting the light emitted by the lighting means toward the mirror arrangement.

17. The inspection device according to claim 16 wherein the reflector is shaped as a paraboloid of revolution.

18. A method for cleaning the inspection device according to claim 1 comprising the step of: ejecting the compressed air from the at least one outlet of the cleaning device along either the disk or the at least a part of the mirrors for removing dust and/or dirt from the disk or the mirrors.

19. A method for cleaning an inspection device comprising the steps of:
   providing an inspection device for inspecting a cable end of a cable, the inspection device including a mirror arrangement with a plurality of mirrors arranged for viewing the cable end from different viewing angles, the inspection device including a camera generating images of the cable end from the different viewing angles from the mirrors, the inspection device including a transparent disk arranged to prevent dirt and/or dust from getting from moving from the mirror arrangement to the camera, the mirror arrangement being arranged on one side of the disk and the camera being arranged on an opposite side of the disk, and the inspection device including a cleaning device having a plurality of outlets, the cleaning device being insertable into an aperture in the inspection device and thereby positioned between the transparent disk and the mirror arrangement; and
   after inspecting the cable end, ejecting compressed air from at least one of the outlets along one of the disk and at least a part of the mirrors to remove any dust and/or dirt from the disk or the mirrors.

\* \* \* \* \*